US012142254B1

(12) United States Patent
Aldoughan et al.

(10) Patent No.: US 12,142,254 B1
(45) Date of Patent: Nov. 12, 2024

(54) UMBRELLA MICROPHONE WITH SOUNDPROOFING

(71) Applicant: KING FAISAL UNIVERSITY, Al-Ahsa (SA)

(72) Inventors: Eman Abdulaziz Aldoughan, Al-Ahsa (SA); Jumana Khalid Alshaikh Husain, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/214,013

(22) Filed: Jun. 26, 2023

(51) Int. Cl.
*G10K 11/28* (2006.01)
*A45B 23/00* (2006.01)
*A45B 25/18* (2006.01)
*G10K 11/20* (2006.01)

(52) U.S. Cl.
CPC .............. *G10K 11/28* (2013.01); *A45B 23/00* (2013.01); *G10K 11/20* (2013.01)

(58) Field of Classification Search
CPC ........ G10K 11/28; G10K 11/26; G10K 11/20; G10K 11/18; A45B 23/00; A45B 25/18; A45B 2025/183; A45B 2025/186
See application file for complete search history.

(56) References Cited

U.S. PATENT DOCUMENTS 269,317 A * 12/1882 Peace .................... A45B 19/02 135/31
1,502,666 A * 7/1924 Grady, Jr. ................ A47C 7/66 181/175
2,207,823 A 7/1940 Ryan
3,217,723 A * 11/1965 Suchy .................... A45B 25/02 135/33.5
3,599,747 A * 8/1971 Hansen .................. G10K 11/28 181/212
3,954,117 A * 5/1976 Wallace ................. A45B 19/04 135/20.2
4,915,670 A * 4/1990 Nesbit .................... A45B 25/00 455/344
5,226,438 A * 7/1993 Dubinsky .............. A45B 15/00 135/33.4
5,268,539 A * 12/1993 Ono ....................... G10K 11/28 181/155
5,421,354 A * 6/1995 Bolton ................. H01Q 15/161 135/20.2
5,894,855 A * 4/1999 Gefell .................... A45B 19/02 135/21
(Continued)

FOREIGN PATENT DOCUMENTS

CA 2018645 A1 * 12/1991
CN 2066731 U * 12/1990
(Continued)

OTHER PUBLICATIONS

CN 2066731 (Year: 1990).*

*Primary Examiner* — Edgardo San Martin
(74) *Attorney, Agent, or Firm* — Nath, Goldberg & Meyer; Joshua B. Goldberg

(57) ABSTRACT

A system and method for improving hearing for listeners using an acoustic canopy is provided. The acoustic canopy is in the general shape of an umbrella with soundproofing material covering the topside of said canopy and a sound reflective material covering the underside of the acoustic canopy.

6 Claims, 5 Drawing Sheets

(56) References Cited

U.S. PATENT DOCUMENTS

| | | | | |
|---|---|---|---|---|
| 6,668,971 | B2 * | 12/2003 | Sterling | B23B 47/00 181/258 |
| 6,720,491 | B1 * | 4/2004 | Kroncke | G10D 13/063 84/422.3 |
| 7,141,101 | B2 * | 11/2006 | Amann | B01D 46/4236 55/497 |
| 7,410,030 | B2 * | 8/2008 | Fusiki | G10K 11/168 181/290 |
| 7,470,846 | B2 * | 12/2008 | May | G10D 13/02 84/411 R |
| 7,947,615 | B2 * | 5/2011 | Springer | E04B 9/0464 442/381 |
| 8,148,619 | B1 * | 4/2012 | May | G10D 13/14 84/411 R |
| 8,262,363 | B2 * | 9/2012 | Gerber | F03D 1/0675 416/500 |
| 8,978,816 | B2 * | 3/2015 | Slotznick | E04B 1/99 181/30 |
| 9,714,508 | B2 * | 7/2017 | Israel | A61B 8/0883 |
| 9,986,798 | B2 * | 6/2018 | Handwerker | A45B 19/04 |
| 9,993,052 | B2 * | 6/2018 | Williams | A45B 11/02 |
| 10,149,058 | B2 * | 12/2018 | O'Polka | H04R 1/323 |
| 2008/0123884 | A1 * | 5/2008 | Donenfeld | A61F 11/30 381/313 |
| 2008/0283102 | A1 * | 11/2008 | Kelley | A45B 23/00 135/16 |
| 2013/0233362 | A1 * | 9/2013 | Miller-Klerer | A45B 23/00 224/576 |
| 2014/0224578 | A1 * | 8/2014 | Blankenship | G10K 11/162 181/290 |
| 2014/0305477 | A1 | 10/2014 | Zemach | |
| 2016/0119699 | A1 | 4/2016 | Caban | |
| 2021/0349375 | A1 * | 11/2021 | Nykolyshyn | F21V 7/18 |
| 2022/0015513 | A1 | 1/2022 | Mullet et al. | |
| 2023/0033412 | A1 | 2/2023 | Alamro et al. | |

FOREIGN PATENT DOCUMENTS

| | | | | | |
|---|---|---|---|---|---|
| CN | 212750361 | U | * | 3/2021 | |
| EP | 1732355 | A1 | * | 12/2006 | H04R 1/028 |
| JP | H0197996 | A | * | 4/1989 | |
| JP | 6441548 | B1 | * | 12/2018 | |
| KR | 200430747 | Y1 | * | 11/2006 | |
| KR | 100933491 | B1 | * | 12/2009 | |
| KR | 20140063287 | A | * | 5/2014 | |
| KR | 20140119377 | A | * | 10/2014 | |

* cited by examiner

40

UMBRELLA MICROPHONE WITH SOUNDPROOFING

BACKGROUND

1. Field

The present disclosure relates a hand-held sound collection and amplification device and associated method for improving one's hearing using the device.

2. Description of the Related Art

Hearing impairment and/or loss is a constant every-day concern of modern society. Considering the amount of noise pollution generated by industrialized nations particularly when it comes to overpopulated cities, discerning speech in such noise rich urban environments can be problematic. Particularly of concern is when the hearing impairment occurs in young children as it can severely impact their auditory maturity as young children work to develop their auditory memory, discrimination, and recall.

A prevalent solution is the incorporation of electronic hearing aids which when placed in the ear can provide an improvement in hearing. However, there are drawbacks with implantable hearing aids. Firstly, since it's an electronic solution, oftentimes, the hearing aids need to be removed for battery replacement and/or charging. Additionally, over the lifetime of the hearing aid, the electronics may malfunction and need costly repairs, or outright replacement. Secondly, the placement of the hearing aid devices within the ear can cause uneasiness to the user, who likely is not used to having items placed within their ear for prolonged periods of time.

What is needed is an alternative solution to hearing aids, a simpler more elegant solution to amplify sound for improved listening without relying upon electronics for audio processing.

SUMMARY

The present subject matter is directed towards a method and device improving broadcast sound using a purely acoustic solution that provides clear audio to a listener.

In a first aspect of the present subject matter, a device for improving broadcast sound using a purely acoustic solution is provided. In this regard, the present subject matter relates to an acoustic canopy device for improving audio from a proximal audio source, comprising: a canopy made up of a plurality of panel sections where a topside of the canopy is adapted for soundproofing capabilities; a plurality of ribs which, when extended, provide support to the canopy such that the canopy is held up and wherein the ribs extend to the edge of the canopy and hold the plurality of panel sections of the canopy in a curved downward shape; a plurality of tips which attach to an outer end of each of the plurality of ribs and extend past the edge of the canopy; and a shaft which extends vertically downward from the center of the canopy and provides support for the ribs and the canopy, wherein an underside of the canopy includes an empty cavity and is partially lined with a liner comprising an aluminum or a plastic barrier, or a combination thereof.

A second aspect of the present subject matter relates to a method for improving audio from a proximal audio source using an acoustic canopy, comprising: locating an acoustic canopy adjacent to said proximal audio source; unfolding said acoustic canopy into an erect configuration such that an underside of said acoustic canopy faces the proximal audio source; affixing said unfolded acoustic canopy using a plurality of ribs which, when extended, provide support to the canopy such that said erect configuration is held in a fixed position with respect to said proximal audio source and wherein the ribs extend to the edge of the canopy and hold the canopy in a curved downward shape; and reflecting audio provided from said proximal audio source back outward from said underside of said acoustic canopy.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF EMBODIMENTS

Figure 1:
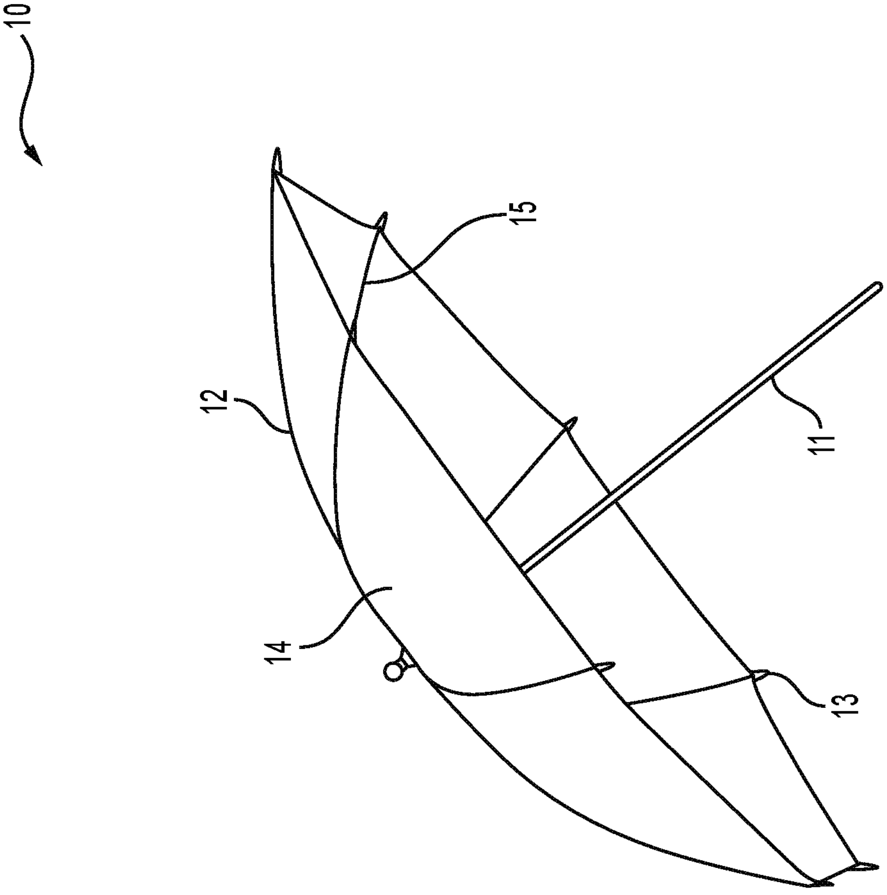
FIG. 1 is a diagram of the present device including a fully deployed configuration of the acoustic canopy.

The following detailed description is merely exemplary in nature and is not intended to limit the described embodiments or the application and uses of the described embodiments. Any implementation described herein with the words "exemplary" or "illustrative" is not necessarily construed as preferred or advantageous over other implementations. All of the implementations described below are exemplary implementations provided to enable persons skilled in the art to make or use the embodiments of the disclosure and are not intended to limit the scope of the disclosure, which is defined by the claims. For the purposes of the description herein, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed therein are not to be considered as limiting, unless the claims expressly state otherwise.

In a first aspect of the present subject matter, a device for improving broadcast sound using a purely acoustic solution is provided. In this regard, the present subject matter relates to an acoustic canopy device for improving audio from a proximal audio source, comprising: a canopy made up of a plurality of panel sections where a topside of the canopy is adapted for soundproofing capabilities; a plurality of ribs which, when extended, provide support to the canopy such that the canopy is held up and wherein the ribs extend to the edge of the canopy and hold the plurality of panel sections of the canopy in a curved downward shape; a plurality of tips which attach to an outer end of each of the plurality of ribs and extend past the edge of the canopy; and a shaft which extends vertically downward from the center of the canopy and provides support for the ribs and the canopy, wherein an underside of the canopy includes an empty cavity and is partially lined with a liner comprising an aluminum or a plastic barrier, or a combination thereof.

In an embodiment, a topside of the canopy of the acoustic canopy device can be covered with soundproofing paint to provide said soundproofing capabilities. In this regard, by way of non-limiting example, the soundproofing paint can be rubber soundproofing paint. In an alternative embodiment, a topside of the canopy of the acoustic canopy device can be covered with flexible foam to provide said soundproofing capabilities. Regardless of the specific soundproofing material used, the soundproofing capabilities of the acoustic canopy device can provide adjacent/rear sound insulation.

In another embodiment, the liner on said underside of said canopy of the acoustic canopy device can further comprise a double hollow cover in said canopy's liner, wherein said aluminum or plastic barrier covers a circumference of the underside of said canopy with an empty cavity at a center of said liner on said underside of said canopy. In an embodiment, the liner on said underside of said canopy can comprise a flexible and hollow aluminum to provide sound rebound to a user of said umbrella. In this regard, the liner, or inner part, of the canopy can be hollow and wrapped with thin aluminum, in a non-limiting example, to ensure that any sound produced underneath or from a source facing the underside of the canopy can be doubled and bounced forward.

In a further embodiment of the present device, said acoustic canopy can have a general shape of an umbrella. In this regard, the canopy can be made up of two, three, four, five, six, seven, eight, or more of said panel sections, or eight of said panel sections.

In an embodiment, the acoustic canopy device can act as a microphone and amplify any sound coming from underneath said acoustic canopy. That is, the acoustic canopy can amplify the voice of someone standing under or facing the underside of the canopy, similar to the amplification provided by an electric microphone, only without actually using an electric microphone. The present acoustic canopy device does not depend on a mattery, electricity, or electronics for providing sound amplification. Rather, the physical configuration of the device performs the work of a microphone. This makes the present device more flexible for use and can sustainably be used at any time, any place, and for any duration, without having to worry about providing electricity to the device for sound amplification.

In another embodiment, the acoustic canopy device described herein can be made using sustainable materials and a sustainable process, thereby reducing carbon emissions.

In another aspect, the present subject matter relates to a method for improving audio from a proximal audio source using an acoustic canopy, comprising: locating an acoustic canopy adjacent to said proximal audio source; unfolding said acoustic canopy into an erect configuration such that an underside of said acoustic canopy faces the proximal audio source; affixing said unfolded acoustic canopy using a plurality of ribs which, when extended, provide support to the canopy such that said erect configuration is held in a fixed position with respect to said proximal audio source and wherein the ribs extend to the edge of the canopy and hold the canopy in a curved downward shape; and reflecting audio provided from said proximal audio source back outward from said underside of said acoustic canopy.

In this regard, in an embodiment of the present methods, a topside of the acoustic canopy can be covered with soundproofing paint or flexible foam. In addition, the acoustic canopy can further comprise a shaft which extends vertically downward from the center of the acoustic canopy and provides support for the ribs and the acoustic canopy, wherein an underside of the canopy can include an empty cavity and can be partially lined with a liner comprising an aluminum or a plastic barrier, or a combination thereof. Further in this regard, the reflecting can include, by way of non-limiting example, using a layer of flexible and hollow aluminum located on said underside of said acoustic canopy to perform said reflecting. Accordingly, in the present methods, the acoustic canopy can amplify the voice of someone standing under or facing the underside of the canopy, similar to the amplification provided by an electric microphone, only without actually using an electric microphone.

As shown in FIG. 1, a diagram of the device for improving broadcast sound using a purely acoustic solution is provided. The device (10) is in the general shape and configuration of a standard unfolded umbrella that, when in use, is held or positioned over the head of the listener or talker depending upon the application. The device (10) includes a canopy (12) made up of, in this embodiment, eight panel sections (14) where the canopy is adapted for soundproofing capabilities for adjacent/rear sound insulation. The soundproofing includes covering the exterior, or topside, of the canopy (12) with a rubber soundproofing paint. In the alternative, the exterior, or topside, can be covered with a flexible foam also for adjacent/rear sound insulation. The canopy (12) when deployed is kept erect by a plurality of ribs (13), which when extended provide support to the canopy (12) such that the canopy is held up. The ribs (13) extend to the edge of the canopy and hold the panels (14) of the device in a curved downward shape. A plurality of tips (15) are attached to the each of the plurality of ribs (13) and extend past the edge of the canopy (12). A shaft (11) which extends vertically downward from the center of the canopy (12) provides a support for the ribs (15) and the canopy (12) in the way a normal shaft for a standard umbrella does.

Figure 2:
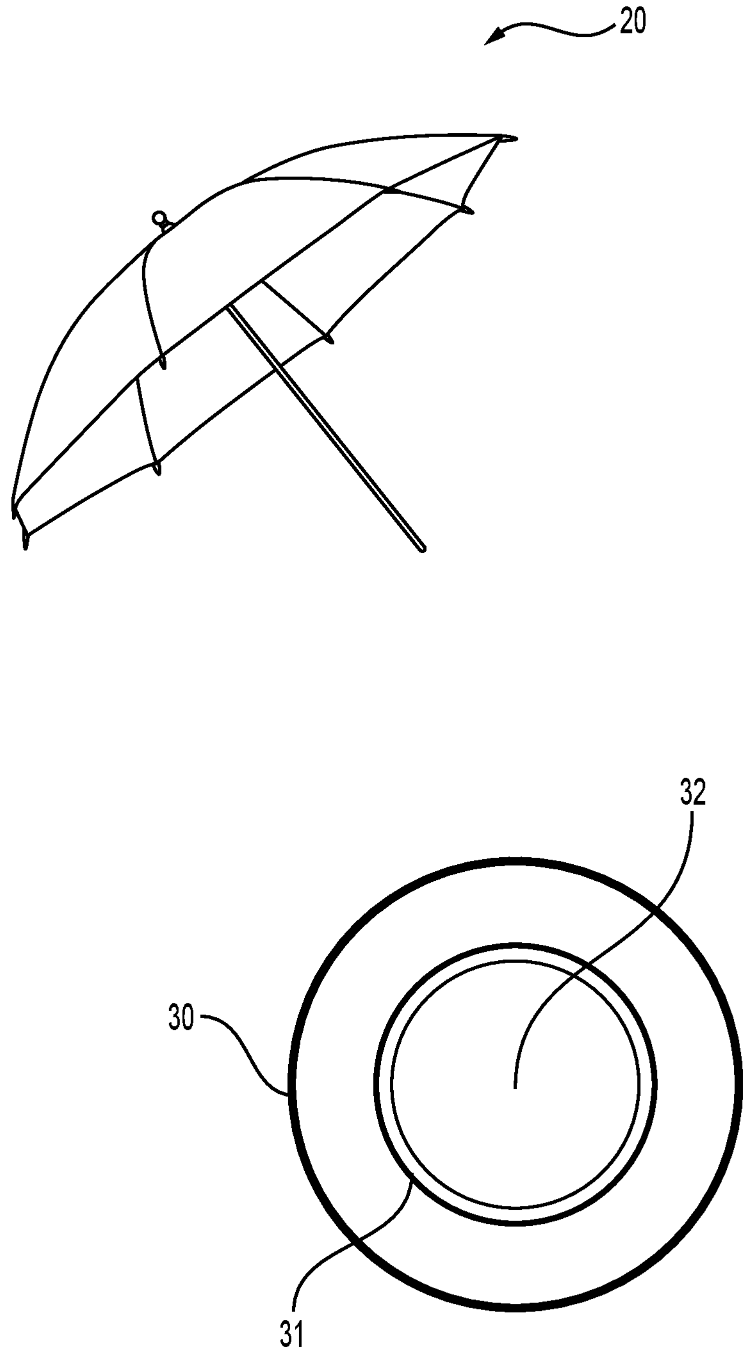
FIG. 2 is a diagram of the present device including a fully deployed configuration of acoustic canopy and a picture of the underside of the acoustic canopy.

FIG. 2 depicts a detailed view of the underside of the acoustic canopy of the device (20). The underside shows an interior circular cavity (32) that resides as an inner concentric circle (31) with regards to the circumference of the underside of the canopy (30). Between the inner concentric circle and the circumference of the underside of the canopy (30) is a ring like area which is covered or wrapped in layer of aluminum or set apart with plastic barriers. Further, the ring like area of the canopy liner, or the entire canopy liner, can include a double hollow covering such that sound is doubled and focused outward and downward for improved audio clarity.

Figure 3:
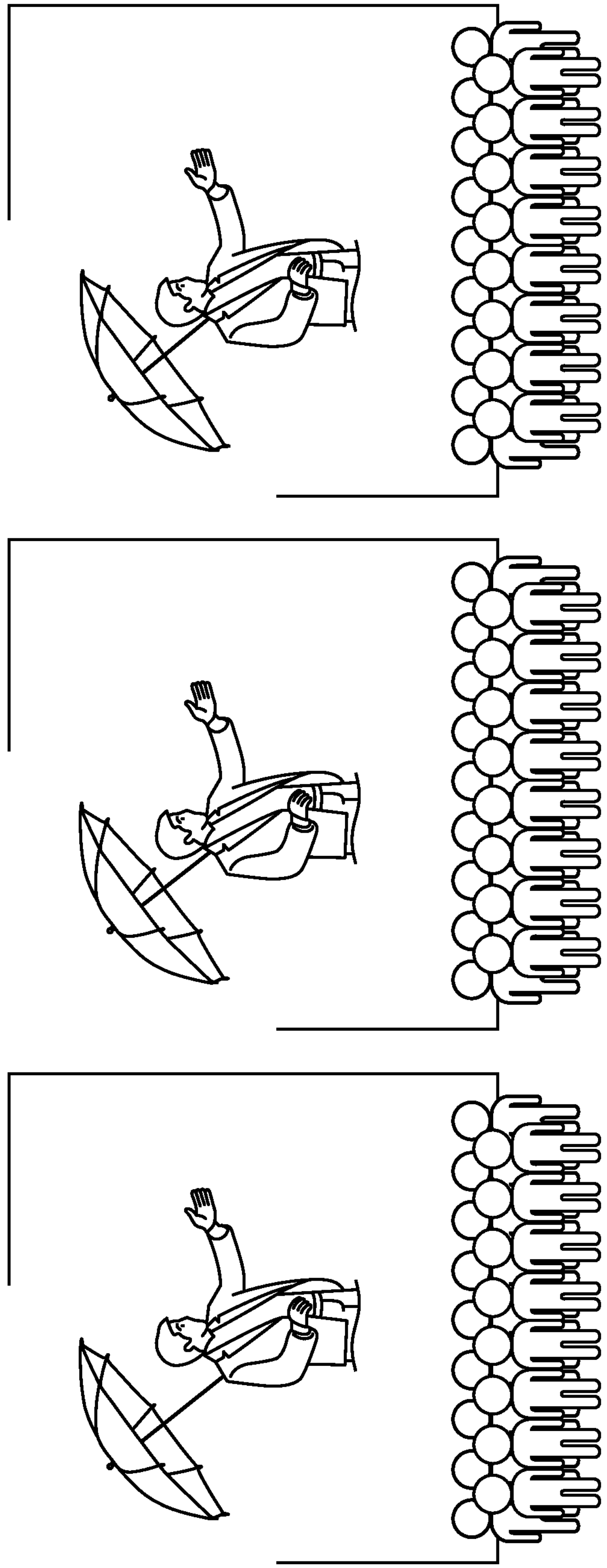
FIG. 3 shows the use of the present device in a large auditorium.
Figure 4A:
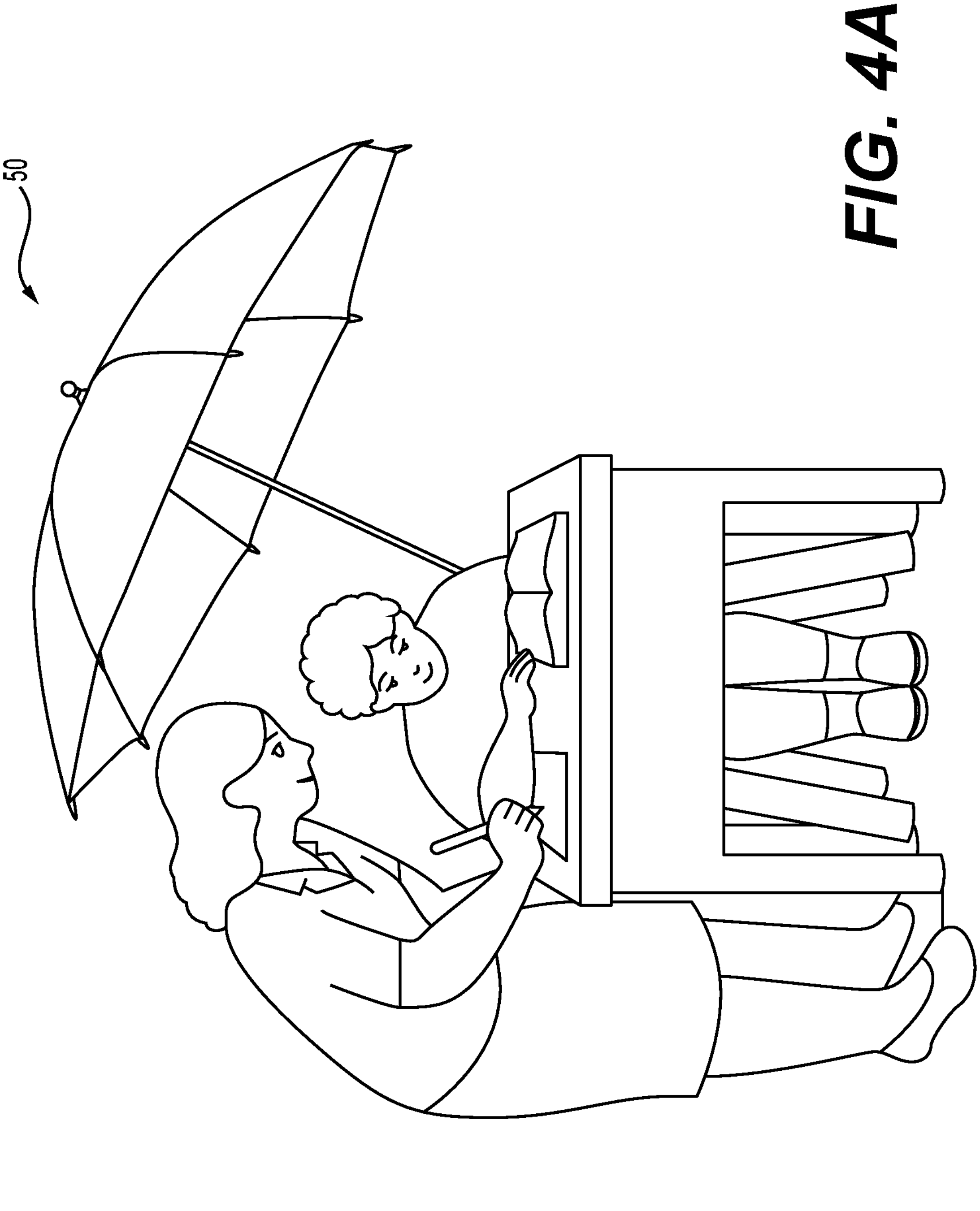
FIG. 4A shows the use of the present device in a library setting.
Figure 4B:
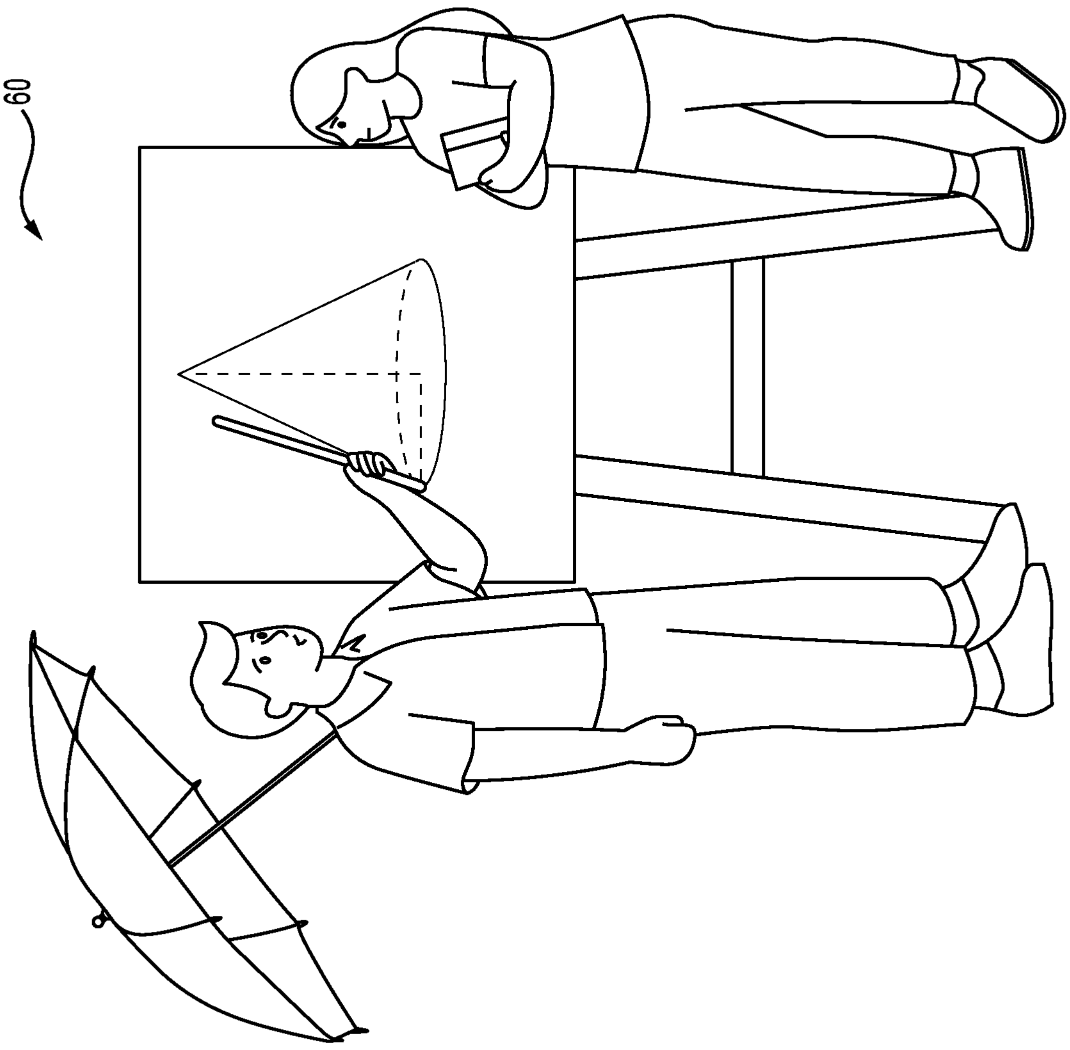
FIG. 4B shows the use of the present device in an educational setting.

FIGS. 3, 4A, and 4B show different uses of the acoustic canopy. FIG. 3 depicts the use of the device when positioned and held erect with a stand (not shown) behind a speaker addressing a large group of individuals (40). Here, the device would help amplify the speaker's speech without the use of a hand-held microphone, PA system, or other dedicated sound system.

FIG. 4A depicts the use of the device in a more individual setting such as a library or classroom (50), where the acoustic canopy is deployed again with a stand (not shown) such that extraneous noise from the rest of the room is kept away from the student due to the soundproofed topside of the acoustic canopy. However, the teacher's voice, when the teacher is positioned underneath the canopy, or facing the underside of the canopy, can enter the underside of the acoustic canopy and be reflected back to the student with more clarity.

Similarly, FIG. 4B is yet another use of the acoustic canopy where it is positioned up near a chalkboard (60) in front of a class or classroom such that anyone explaining a concept using the chalkboard and positioned underneath the canopy, or facing the underside of the canopy, can have their voice clearly disseminated from the chalkboard on out through the rest of the classroom. That is, the speaker's voice would be amplified such that all people present in the classroom can hear the speaker, without the use of a microphone.

By way of non-limiting example, the present methods can be practiced to teach languages to children, facilitate major activities or events, and the like. In this regard, for teaching languages to children, the present device can contribute to the development of the skill of auditory maturity in children, which can include the sense of hearing, auditory memory, auditory discrimination, other sound effects, and other aspects of auditory communication. By using the present device, the child's memory of what they were taught can be improved over a period of time, enabling improved recollection. These factors are improved through the sound bouncing back to the child's ear due to the echo, which is expected to achieve clearer hearing, the ability to understand what is heard, and the ability to pronounce words correctly. Further, the present device and methods can be helpful in removing any customary fear the child may have when holding a microphone.

For facilitating major events and activities, the present devices and methods can be used to assist in various activities and events held in huge spaces with very high ceilings, and in outdoor events. Typically, the speakers in the corners of the area are limited to hearing the group closest to them in the corner, which at times does not exceed 3-4 people. In contrast, through using the present device, the benefit can be maximized to exceed 10-15 people close to the corner who can hear the speaker by blocking any sound from the adjacent corners and in return raising the volume from the nearby speaker for the corner visitor.

The methods associated with the use of the present device include unfolding the acoustic canopy device and positioning it such that when one speaks, the speaker's voice carries into the underside of the acoustic canopy and then is reflected back out to the speaker's audience. Further, the insulation on the topside of the acoustic canopy device will prevent outside noise from interfering and also being amplified, such that only the speaker's voice will be amplified.

It is to be understood that the acoustic canopy and method for using the acoustic canopy is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. An acoustic canopy device for improving audio from a proximal audio source, comprising:

a canopy made up of a plurality of panel sections where a topside of the canopy is adapted for soundproofing capabilities;

a plurality of ribs which, when extended, provide support to the canopy such that the canopy is held up and wherein the ribs extend to the edge of the canopy and hold the plurality of panel sections of the canopy in a curved downward shape;

a plurality of tips which attach to an outer end of each of the plurality of ribs and extend past the edge of the canopy; and a shaft which extends vertically downward from the center of the canopy and provides support for the ribs and the canopy, wherein an underside of the canopy includes an interior circular empty cavity, said interior circular empty cavity residing within an inner concentric circle of the underside of said canopy, wherein said topside of said canopy is covered with rubber soundproofing paint to provide said soundproofing capabilities, wherein said topside of said canopy is covered with flexible foam to provide said soundproofing capabilities, and wherein a circumference of the underside of the canopy is larger than a circumference of the inner concentric circle such that a ring is formed in an area between the circumference of the underside of the canopy and the circumference of the inner concentric circle, said ring being partially lined with a liner comprising an aluminum or a plastic barrier, or a combination thereof.

2. The acoustic canopy device for improving audio from a proximal audio source as recited in claim 1, wherein said soundproofing capabilities provide adjacent/rear sound insulation.

3. The acoustic canopy device for improving audio from a proximal audio source as recited in claim 1, wherein said acoustic canopy has a general shape of an umbrella.

4. The acoustic canopy device for improving audio from a proximal audio source as recited in claim 1, wherein said canopy is made up of eight of said panel sections.

5. A method for improving audio from a proximal audio source using an acoustic canopy, comprising:

locating an acoustic canopy adjacent to said proximal audio source wherein said acoustic canopy includes an interior circular empty cavity, said interior circular empty cavity residing within an inner concentric circle of an underside of said acoustic canopy;

unfolding said acoustic canopy into an erect configuration such that the underside of said acoustic canopy faces the proximal audio source;

affixing said unfolded acoustic canopy using a plurality of ribs which, when extended, provide support to the acoustic canopy such that said erect configuration is held in a fixed position with respect to said proximal audio source and wherein the ribs extend to the edge of the acoustic canopy and hold the acoustic canopy in a curved downward shape; and reflecting audio provided from said proximal audio source back outward from said underside of said acoustic canopy, wherein said topside of said acoustic canopy is covered with rubber soundproofing paint to provide said soundproofing capabilities, wherein said topside of said acoustic canopy is covered with flexible foam to provide said soundproofing capabilities, and wherein a circumference of the underside of the acoustic canopy is larger than a circumference of the inner concentric circle such that a ring is formed in an area between the circumference of the underside of the acoustic canopy and the circumference of the inner concentric circle, said ring being partially lined with a liner.

6. The method as recited in claim 5, wherein said acoustic canopy further comprises a shaft which extends vertically downward from the center of the acoustic canopy and provides support for the ribs and the acoustic canopy, wherein an underside of the canopy includes an empty cavity and is partially lined with a liner comprising an aluminum or a plastic barrier, or a combination thereof.

* * * * *